United States Patent [19]

Bédu et al.

[11] Patent Number: 4,496,873

[45] Date of Patent: Jan. 29, 1985

[54] FLASH TUBE HAVING COAX CABLE CONNECTOR

[75] Inventors: Marcel Bédu, Clamart; Jean-Claude Farcy, Briis-sous-Forges; Christian Goin, Grigny, all of France.

[73] Assignee: Commissariat a l'Energie Atomique, Paris, France

[21] Appl. No.: 385,254

[22] Filed: Jun. 4, 1982

[30] Foreign Application Priority Data

Jun. 5, 1981 [FR] France ............................... 81 11143

[51] Int. Cl.[3] ....................... H01J 61/28; H01J 61/80; H01S 3/092

[52] U.S. Cl. ............................... 313/231.71; 313/631; 313/318; 372/72

[58] Field of Search ................... 313/631, 634, 231.71, 313/318, 51, 113; 174/50.52, 50.55; 372/72, 80, 82, 88, 87

[56] References Cited

U.S. PATENT DOCUMENTS 2,342,806 2/1944 Hofmann ............................ 315/326
3,172,000 3/1965 Rosener, Jr. et al. .......... 313/631 X
3,447,030 5/1969 Gallagher et al. ......... 313/231.71 X
3,555,449 1/1971 Osial et al. ........................ 372/72 X
3,721,917 3/1973 Sereda et al. ......................... 372/72
3,993,922 11/1976 Cosco et al. .................... 313/113 X

FOREIGN PATENT DOCUMENTS 2345809 10/1977 France .

*Primary Examiner*—Palmer Demeo
*Assistant Examiner*—Sandra L. O'Shea
*Attorney, Agent, or Firm*—Kerkam, Stowell, Kondracki & Clarke

[57] ABSTRACT

Flash tube comprising a discharge tube made from a transparent material, an electrode located at either end of the discharge tube, one electrode serving to be raised to earth potential and the other to a high potential, an electrical connection connecting each electrode to one of the conductors of a supply line, wherein each electrode is connected to the discharge tube by gaskets and wherein each electrical connection is positioned radially with respect to the discharge tube.

The flash tube is intended more particularly for use in the optical pumping of lasers in the visible or near ultraviolet range.

2 Claims, 1 Drawing Figure

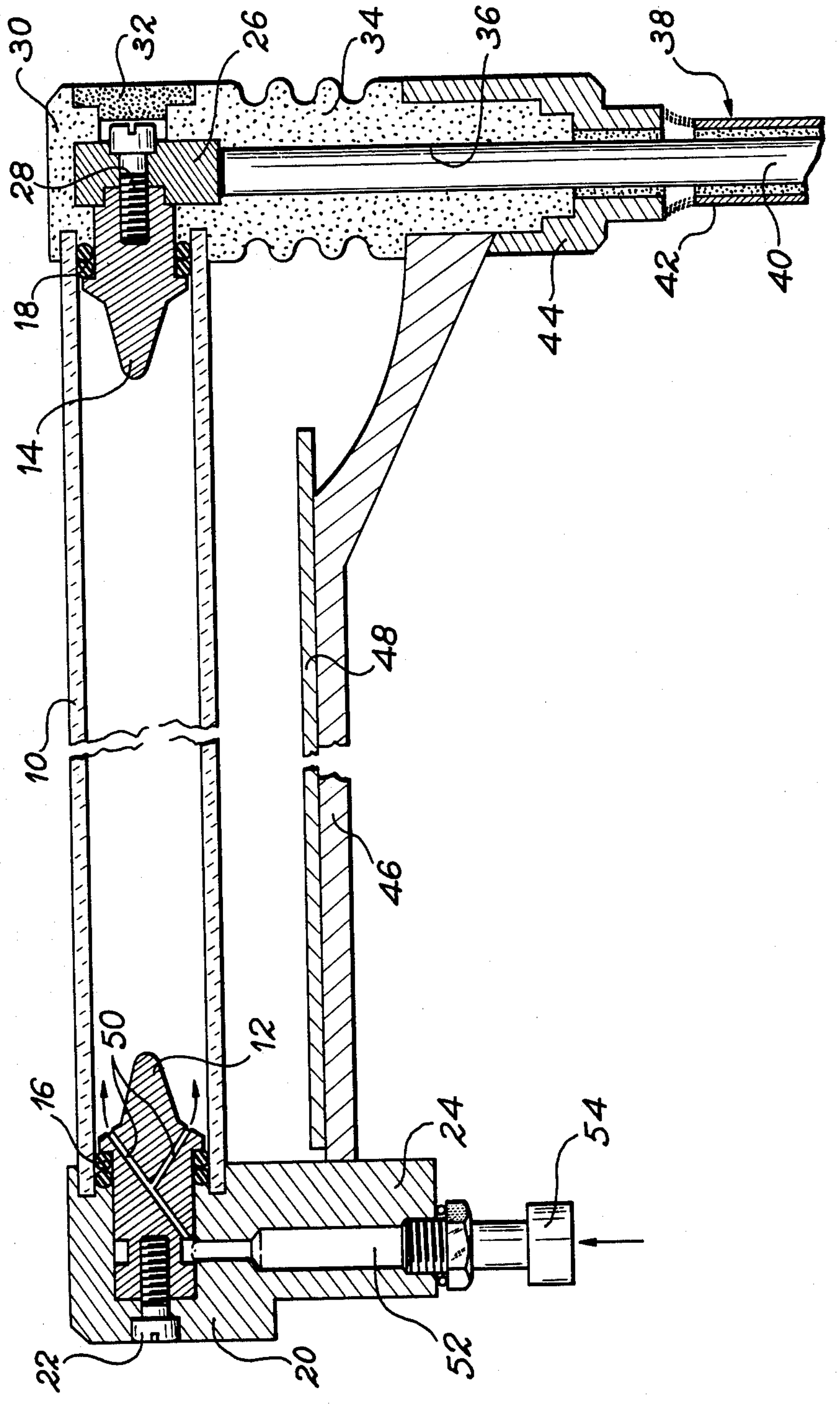
30
32
26
34
36
38
28
18
14
44
42
40
48
10
46
50
12
16
24
54
22
20
52

FLASH TUBE HAVING COAX CABLE CONNECTOR

BACKGROUND OF THE INVENTION

The present invention relates to a flash tube with radial electrical connections and which is supplied with gas. It is more particularly used in optical pumping in lasers (particularly iodine lasers) in the visible or near ultraviolet range.

In conventional flash tubes, the electrodes are connected to metal rods serving as electrical connections. These rods are located in the axis of the discharge tube and are connected thereto by glass-metal seals. This leads on the one hand to considerable production difficulties and on the other to a significant "dead" length (i.e. a part not contributing to light emission). Moreover, as these tubes are sealed, the gaseous medium in which the discharge takes place cannot be renewed, so that its purity gradually decreases limiting the life of the tube to a few thousand flashes. In addition, the nature and pressure of the gaseous medium are definitively fixed.

BRIEF SUMMARY OF THE INVENTION

The object of the present invention is to obviate these disadvantages. It therefore relates to a discharge tube, whose construction technology is simple, which has a reduced dead space and which has a long service life.

According to the invention this object is achieved in that the electrodes are now connected to the discharge tube by gaskets instead of being sealed thereto. The elimination of the seals greatly simplifies the tube production process. It also permits the use of electrical connections which, instead of being located in the tube axis, are positioned radially relative thereto, which reduces the overall dimensions and dead length of the flash tube. Finally, due to the ease of installing the electrodes, it is possible to provide one of them with a gas supply and discharge pipe which enables the gas to be periodically renewed, so that the tube life is increased. Furthermore, by adjusting the pressure of the gas or modifying its nature, a certain flexibility is given to the operation of the laser device using these discharge tubes.

DESCRIPTION OF THE DRAWING AND PREFERRED EMBODIMENTS

The invention is described in greater detail hereinafter relative to a non-limitative embodiment and the attached drawing, which, in longitudinal section, shows a flash tube according to the invention.

As shown in the drawing, the flash tube essentially comprises a discharge tube 10 made from transparent material (for example silica) closed by two electrodes 12 and 14 connected to tube 10 by joints or gaskets 16 and 18. These joints or gaskets seal the discharge tube and ensure a certain flexibility in the connection of the electrodes to the tube. One of the electrodes, namely electrode 14, is to be raised to a high potential during the tube excitation period, whereas the other electrode, i.e.

electrode 12 is brought to earth potential. The latter electrode is fixed into a metal end fitting 20, e.g. by means of a screw 22, said end fitting comprising a metal sleeve 24 positioned radially with respect to the discharge tube and serving as an electrical connection. Electrode 14 which is to be raised to a high potential is joined to a metal electrical connecting part 26 by means of a screw 28. Electrode 14 and part 26 are integrated into an insulating end fitting 30 provided with an insulating plug, 32. End fitting 30 is joined to an insulating material sleeve 34, positioned radially with respect to the discharge tube. Sleeve 34 is traversed by a pipe 36.

The flash tube is supplied with electricity by a coaxial cable, whose inner conductor 40 follows pipe 36 and is welded to connecting piece 26. The outer conductor 42 of the cable is connected to a metal part 44, which is fixed to the end of insulating sleeve 34. Part 44 is connected to metal sleeve 24 of electrode 12 by a metal bar 46 extending parallel to discharge tube 10.

This connecting method limits the inductance of the circuit and makes it possible to obtain short discharge. In addition, bar 46 can be used as a support for reflector 48, located around the flash tube and able to concentrate the light emitted by the latter towards the utilization member.

Electrode 12, which is raised to earth potential, also has small diameter holes 50 connected to a pipe 52 in metal sleeve 24. At the end of the latter is a coupling 54, which can be connected to a not shown gas source.

These means make it possible to introduce gas into the discharge tube, the discharge of polluted gas after a certain number of flashes and then the reintroduction of fresh gas. They also make it possible to regulate the pressure of the gas with a view to optimizing the performance of the discharge tube.

What is claimed is:

1. A flash tube comprising a discharge tube made from a transparent material, a first electrode located at a first end of the discharge tube, a second electrode located at a second end of the discharge tube, said first electrode being raised to earth potential and said second electrode to a high potential, said first electrode being fixed into a metal end fitting, provided with a metal sleeve positioned radially with respect to the discharge tube, said second electrode being fixed to a metal connecting piece located in an insulating end fitting provided with an insulating sleeve positioned radially with respect to the discharge tube, said sleeve being traversed by a pipe, a coaxial cable having a central conductor following the pipe of the insulating sleeve and being connected to said metal connecting piece of said second electrode, said coaxial cable having an outer conductor which is connected to said metal sleeve of said first electrode by a metal bar parallel to said discharge tube, an optical reflector being fixed to said metal bar.

2. A flash tube according to claim 1, wherein said first electrode is provided with holes and wherein said metal sleeve is traversed by a duct linked with said holes and provided with a coupling for gas supply and discharge.

* * * * *